United States Patent [19]

Chareire

[11] Patent Number: 5,293,966
[45] Date of Patent: Mar. 15, 1994

[54] MULTI-DISK BRAKING DEVICE

[75] Inventor: Jean-Louis Chareire, Levallois Perret, France

[73] Assignee: Aerospatiale Societe Nationale Industrielle, Paris, France

[21] Appl. No.: 93,459

[22] Filed: Jul. 16, 1993

Related U.S. Application Data

[63] Continuation of Ser. No. 862,341, Apr. 2, 1992, abandoned.

[30] Foreign Application Priority Data

Apr. 19, 1991 [FR] France .................. 91 04849

[51] Int. Cl.⁵ .................. F16D 55/08; B60T 13/00; B61H 13/00
[52] U.S. Cl. .................. 188/72.1; 188/18 A; 188/71.1; 188/71.5; 188/251 A; 188/151 A; 188/71.4; 188/156; 303/3; 303/9.61; 303/14
[58] Field of Search .................. 303/9, 9.61, 13, 20, 303/14–15, 2–4; 188/71.1, 71.4, 71.5, 72.4, 72.5, 151 A, 156, 251 R, 251 A, 369, 18 A, 1.11, 158, 159, 106 P, 106 F, 106 R, 72.1,

[56] References Cited

U.S. PATENT DOCUMENTS

| | | | |
|---|---|---|---|
| 3,951,240 | 4/1976 | Dowell et al. | 188/251 A X |
| 4,207,968 | 6/1980 | Chamberlain | 188/369 X |
| 4,671,577 | 6/1987 | Woods | 188/156 X |
| 4,923,056 | 5/1990 | Nedelk | 188/71.1 |
| 4,986,610 | 1/1991 | Beck et al. | 303/9.61 X |
| 5,046,590 | 9/1991 | Trema | 188/715 X |
| 5,172,960 | 12/1992 | Chareire | 303/9.61 X |
| 5,184,875 | 2/1993 | Wrede | 303/20 |

FOREIGN PATENT DOCUMENTS

| | | |
|---|---|---|
| 2026478 | 12/1970 | Fed. Rep. of Germany . |
| 2412542 | 9/1974 | Fed. Rep. of Germany ..... 188/72.5 |
| 2812643 | 10/1978 | Fed. Rep. of Germany . |
| 2745283 | 4/1979 | Fed. Rep. of Germany ..... 188/71.1 |
| 679667 | 9/1952 | United Kingdom . |
| 2197924 | 6/1988 | United Kingdom . |

Primary Examiner—Douglas C. Butler
Attorney, Agent, or Firm—Marshall, O'Toole, Gerstein, Murray & Borun

[57] ABSTRACT

A multi-disk braking device for a vehicle, particularly a train equipped with a braking retarder, includes a first set of metallic braking disks and a second set of carbon braking disks. Under normal operation of the train, the braking retarder is used to slow the train to a predetermined relatively slow speed, and the metallic disks are then actuated to complete the stop. If the braking retarder fails, the carbon disks, not used in normal operation, are actuated to bring the train to a slow speed or to a complete stop.

15 Claims, 3 Drawing Sheets

MULTI-DISK BRAKING DEVICE

This is a continuation of U.S. application Ser. No. 07/862,341, filed Apr. 2, 1992, now abandoned.

The present invention relates to multi-disk braking device for vehicles provided with braking retarders.

The braking device according to the invention is more particularly, though not exclusively, intended for railroad vehicles, called hereinafter trains and equipped in this case with electrical retarding devices (by means of traction motors).

It is known in fact that the braking of a train of this type is obtained by the successive use of a device having an electrical retarder and a friction device. Thus, in order to stop a train, the retarder is first of all actuated so as to slow the train down to a given, relatively low, speed and then, when the train has reached this speed at which the electrical retarder becomes ineffective, the friction device is, in turn, actuated until the train stops completely.

The braking is carried out largely by the electrical retarder since it is estimated that the energy to be stored in the disks of the friction device does not reach 3% of the total energy to be supplied.

However, despite the modest contribution to the braking from the disk device and because of the safety standards imposed, the multiple disks of the braking device must be dimensioned in such a way as to be able to brake and stop the train in the event of failure of the electrical retarder. Moreover, the considerable energy which must then be absorbed by the multi-disk device, during a malfunction of the electrical retarder, may lead to the choice of carbon as the braking material for the disks in place of disks conventionally made from metal (for example steel, some of which are provided with friction linings), especially because of its high specific heat and its high-temperature withstand properties.

However, such a carbon-disk braking device involves a high maintenance cost. In addition, the wear performance of these disks used in this railroad application is only average. In fact, the choice of carbon is particularly desirable during braking operations requiring significant amounts of energy to be absorbed, that is to say, in the present application, should the electric retarder fail, which is relatively rare. Most braking operations in which the disk device comes into play require only low energies to be absorbed, for which carbon is of average effectiveness, whereas metal disks offer an equivalent effectiveness at very much lower cost.

The object of the present invention is to overcome these drawbacks, and the invention relates to a multi-disk braking device combining the specific advantages provided by metal and carbon disks, so as to ensure an optimal braking operation in all service situations.

To this end, the multi-disk braking device for a vehicle, especially a railroad vehicle, equipped with a braking retarder, is noteworthy, according to the invention, in that it comprises at least:

a first set of disks made from a metallic material and of which at least some are integrally connected, in terms of rotation, to a rotary element of said vehicle;

first pressure means capable of acting on the first set of disks and joined to a stationary element of said vehicle;

a second set of disks made from carbon and of which at least some are integrally connected, in terms of rotation, to said rotary element;

second pressure means capable of acting on the second set of disks and joined to said stationary element of the vehicle;

means for controlling the actuation of said first pressure means as soon as the vehicle, braked by the retarder, reaches a prescribed limiting speed; and means for detecting an operational anomaly of said retarder and applying the second pressure means.

Thus, thanks to the invention, the sets of disks only come into play when used in their respectively most effective regimes. For example, when the vehicle is braked by the retarder, only the first set of metallic disks is actuated as soon as the vehicle reaches the prescribed limiting speed. The second set of carbon disks does not come into play and therefore is not subject to wear. By contrast, should the retarder fail at a high speed of the vehicle, greater than the limiting speed, the second set of carbon disks is immediately applied and enables the vehicle to be braked until it stops, thanks to the intrinsic performance of carbon. Thus, as soon as the vehicle, braked in this case by the second set of carbon disks, reaches the limiting speed, the first set of metallic disks may, where appropriate, come into play and thus participate in stopping the vehicle.

It may be seen, therefore, that the device in accordance with the present invention uses a hybrid braking solution (metallic disks and carbon disks) permitting judicious utilization of each set, the optimum performance of which does not correspond to the same conditions of use. This hybrid braking solution offered by the device of the invention is favorable both as regards cost, weight and overall size and as regards energy control and braking power. It is therefore particularly applicable to railroad vehicles and to a lesser extent to heavy-duty trucks.

The weight of the metallic disks is less than the total weight of the carbon disks because of the very large disproportion in the kinetic energies which they may have to absorb. The weight gain is therefore almost as big as if all the disks were of carbon.

The number of metallic disks is also generally less than that of carbon disks. However, this number has to remain sufficient in order that the stopping of the train does not require recourse to an excessive force exerted by said first pressure means.

Said first and second pressure means are advantageously mounted on one and the same support, integrally connected to said stationary element, reducing the weight of said device and simplifying its design. More particularly, said first and second sets of disks are respectively disposed on each side of said support.

In a preferred embodiment, the disks of each set are alternately joined to the rotary element and to the stationary element and are capable, under the action of their respective pressure means, of sliding axially in order to be applied against each other.

Moreover, said first and second sets of disks are housed in respective housings connected to said stationary element, and said disks of the first and second sets are axially mounted on keys respectively provided on the housings integrally connected to the stationary element and on a hub integrally connected to said rotary element. In this mounting, the two housings are respectively fixed on each side of said support of the first and second pressure means, said housing of the second set of carbon disks being integrally connected to said stationary element and being traversed by the rotary element, in contrast to the housing of the first set of metallic disks.

Furthermore, said first and second pressure means are defined by thrust devices whose pistons are capable of acting respectively on the first and second sets of disks. In this case, said thrust devices are preferably alternately and equi-angularly distributed in relation to said support.

According to another characteristic of the device, said first pressure means are capable of acting on the second set of carbon disks should said second pressure means fail operationally, detection means being provided in order to detect said failure and to allow the actuation of said first pressure means at a speed greater than the prescribed limiting speed. Thus, the operational safety conferred by the device of the invention is further enhanced.

In this case, each thrust device of said first pressure means may comprise:

a piston-shaped intermediate jacket capable of acting against the carbon disks and mounted between the cylinder of the thrust device, which is integrally connected to the support, and said piston capable of acting against the metal disks; and a thermal safety member joined to the end of the jacket, opposite its end-part, and surrounding said piston, said thermal member keeping said jacket butted up to the carbon disks, as long as the temperature of the metal disks is less than an overheating temperature of said disks, and, by melting, releasing said jacket which acts, under the action of the hydraulic fluid feeding the thrust devices, against the carbon disks when the overheating temperature of the metal disks is reached. Thus, each thrust device is of the opposing-action double-piston type, each piston of which operates depending on the state of the thermal member. More particularly, said thermal safety member is defined by a ring made from a material which melts as soon as the metallic disks have reached the specified overheating temperature.

Moreover, a casing, made from a heat-conducting material, surrounds the front portion of each piston, which portion is turned towards the metallic disks, said thermal member being applied around said casing, and an intermediate casing, made from an insulating material, is interposed between said front portion of each piston and said heat-conducting casing. This arrangement avoids heat losses to the piston. The two superposed casings are then fixed to the front portion of the piston by means of a screw or the like.

Moreover, each thrust device cylinder advantageously forms an integral part of said support.

The figures of the attached drawing will make it easier to understand how the invention may be realised. In these figures, identical references designate like elements.

Figure 1:
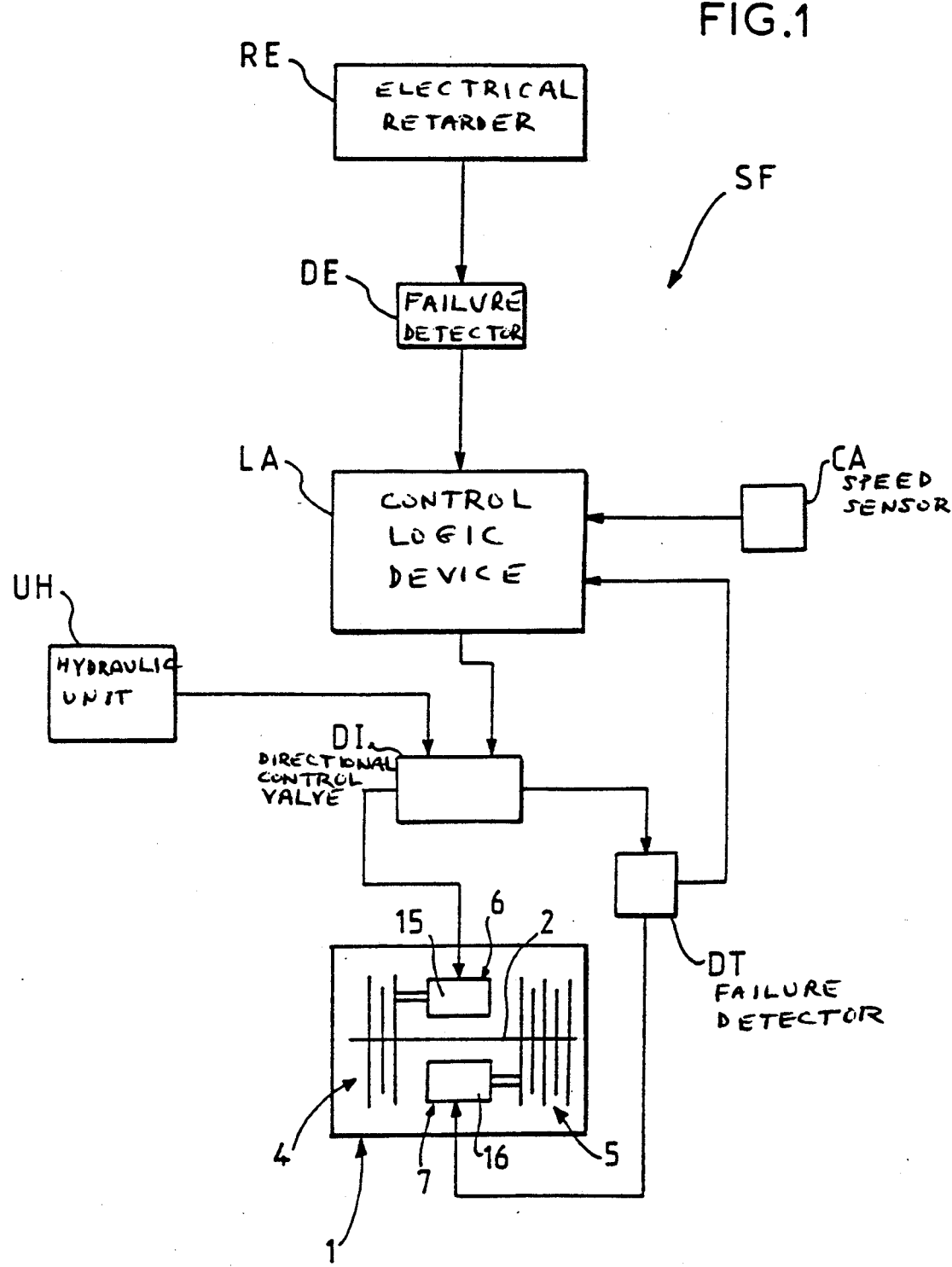
FIG. 1 shows a schematic diagram of a braking system for a railroad vehicle, comprising especially the multi-disk device of the invention.

The braking system SF, shown diagrammatically in FIG. 1, comprises, in the application to a railroad vehicle, an electrical retarder RE to which are advantageously connected, as a safety measure, means for detecting a possible anomaly in its operation, such as a detector DE. The latter is associated with a control logic device LA for the braking system, which controls, for example, an electrohydraulic directional control valve DI, fed with fluid by a hydraulic unit UH and connected to the multi-disk braking device 1 of the invention. As explained previously, the electrical retarder RE, when it is actuated, has the purpose of slowing the train down to a relatively low, prescribed limiting speed VL from which, thanks to triggering means, such as a speed sensor CA, which are connected to the control logic device LA, the braking device 1 is then applied, by the directional control valve DI, in order to brake the train down until it stops.

Figure 2:
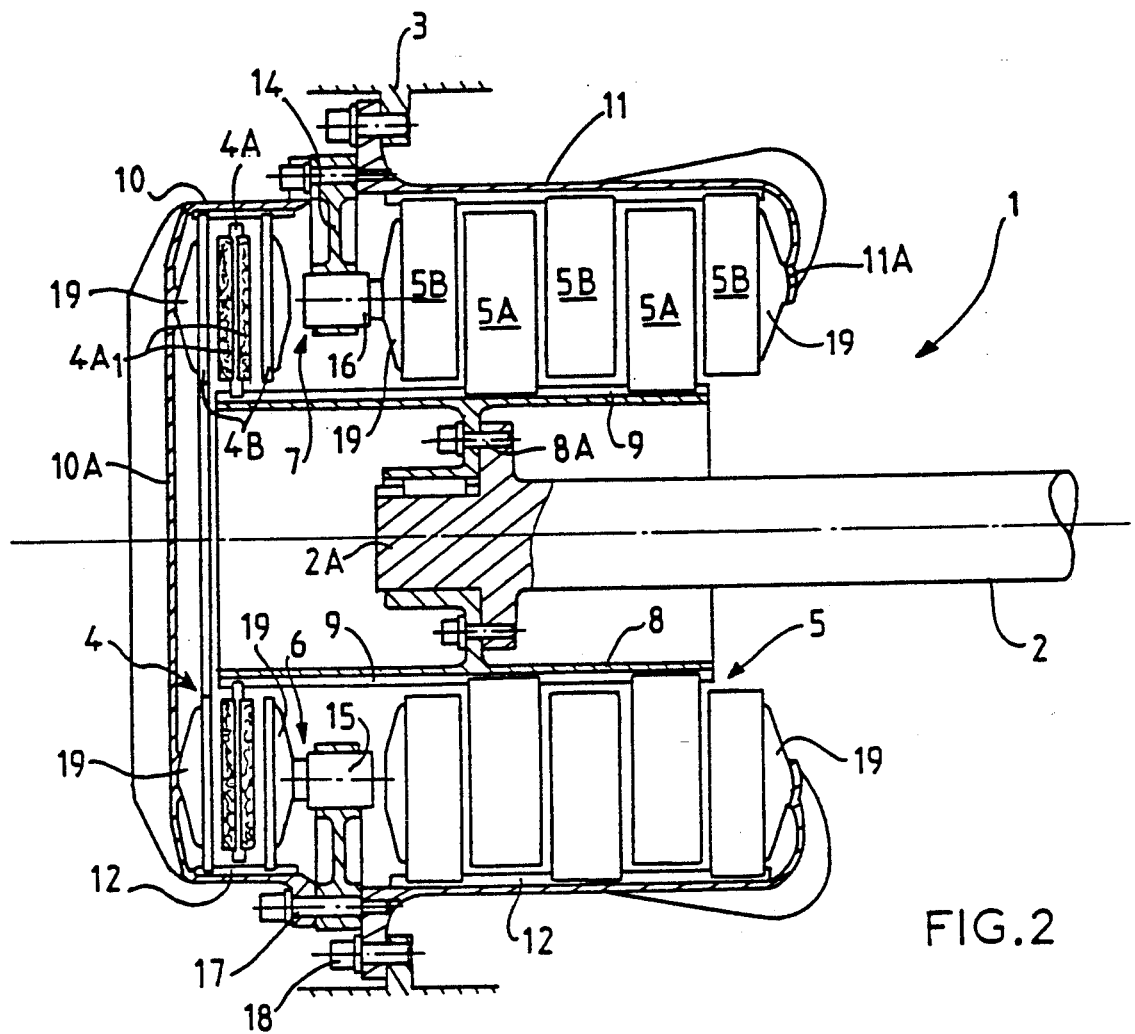
FIG. 2 is a sectional view of an exemplary embodiment of the multi-disk braking device of the invention.

More particularly, the braking device 1 shown in FIG. 2 is arranged between a rotary element to be braked, such as a shaft 2 mechanically and integrally connected to the wheels, and a stationary element, such as the structure 3 of the corresponding truck. According to the invention, the device 1 comprises, for example, a first set of disks 4 made from a metallic material and a second set of disks 5 made from carbon, first and second pressure means 6 and 7 being capable of acting respectively on the first and second sets of disks 4 and 5.

It is understood therefore that, when the electrical retarder RE is working, the first pressure means 6 act, by the agency of the control logic device LA and the directional control valve DI, on the first set of metallic disks 4 as soon as the train, braked by the retarder, reaches the prescribed limiting speed VL supplied by the sensor CA. The second set of carbon disks 5 remains inactive in this case. By contrast, in the case of a breakdown of the electrical retarder, while the train is running at a speed greater than the limiting speed VL, the second pressure means 7, which are controlled by the detector DE picking up the malfunction of the retarder, the control logic device LA and the directional control valve DI, immediately act on the second set of carbon disks 5. The latter, thanks to their structural characteristics, then brake the train reliably and effectively until it stops. It is also possible to provide for the metallic disks 4 to come into action as soon as the train has reached the limiting speed VL thanks to the action of the carbon disks.

In a known manner, the disks of said sets are defined by stators and rotors which, in this embodiment, are alternately connected to the rotary shaft 2 and to the stationary structure 3. More particularly, the first set of metallic disks 4 comprises a rotor 4A and two stators 4B, whereas the second set of carbon disks 5 comprises two rotors 5A and three stators 5B. Moreover, the rotors 4A and 5A are mounted on one and the same hub 8 which is solidly connected to the end 2A of the shaft 2 by means of screws 8A, said rotors usually being joined, in terms of rotation, to the hub 8 and being capable of sliding axially in relation to the latter by means of a conventional mounting having keys 9 provided on the hub. By contrast, the stators 4B and 5B are mounted inside respective housings 10 and 11, said stators being stationary, in terms of rotation, in relation to the housings and being capable of sliding axially thanks to a mounting using keys 12 provided on the internal periphery of each housing.

The number of carbon or metal disks could be different. The only elements which have to be complied with are, on the one hand, the total weight of the carbon or metallic disks, taking into account their refractabilities, specific heats and respective kinetic energies to be absorbed and, on the other hand, the necessity of exerting a sufficient total braking torque with the set of disks of each sort, taking into account the forces exerted by the pressure means, the respective coefficience of friction and the number of disks of each sort. It should be noticed moreover that the rotor 4A is, for example, lined on its two faces with friction linings $4A_1$ made from ceramic or a different material and against which the metal stators 4B are applied.

As is shown in FIG. 2, the first 6 and second 7 pressure means are mounted on one and the same support 14 which is integrally connected to the stationary structure 3 and disposed, consequently, between the two sets of disks 4 and 5. These pressure means are conventionally constituted by two groups of thrust devices 15 and 16 capable of acting respectively against the first and second sets 4 and 5.

As will be seen subsequently, the metal disks 4 are advantageously located on the external side of the end 2A of the rotary shaft, that is to say, in FIG. 2, to the left of the support 14. The housing 10, inside which these disks 4 are housed, is fixed, in this embodiment, by means of screws 17 to the support 14 and to the housing 11, whereas the latter, inside which the disks 5 are arranged, is then rendered integrally connected to the stationary structure 3 of the truck by means of screws 18.

Furthermore, the thrust devices 15 and the thrust devices 16 of said pressure means are disposed alternately and equi-angularly distributed in relation to the support 14. The number of thrust devices 15 and 16 of each group may, for example, lie between five and eight. Moreover, it may be seen from FIG. 2 that the thrust devices 15 and 16 are associated, in a known way, with metallic plates 19, both in the end-part 10A of the housing 10 and in the open end-part 11A of the housing 11. Thus, when the thrust devices 15 or 16 act, the pressure plates 19, respectively disposed on either side of each set 4 and 5, press the stators and the rotors against each other.

Thanks to the fact that the first and second sets of disks 4 and 5 are each actuated by a group of thrust devices 15 or 16, it is possible, in order to increase the safety of the device 1, to utilize the thrust devices 15 of the first pressure means 6 in order to act advantageously on the second set of carbon disks 5, especially should the second pressure means 7, or the hydraulic system feeding them, fail. For example, this failure may be picked up by a detector DT provided on the hydraulic linkage between the directional control valve DI and the second means 7 (FIG. 1) and connected to the control logic device LA.

Figure 4:
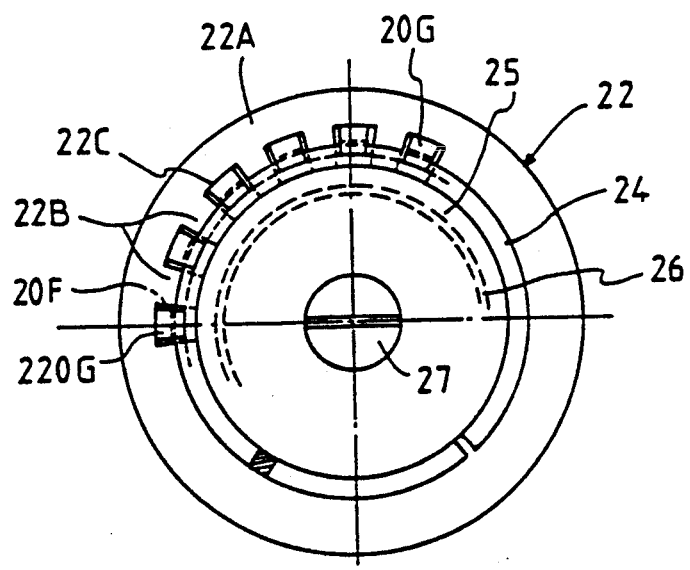
FIG. 4 shows a partial end view of said thrust device along the arrow F of FIG. 3.
Figure 3:
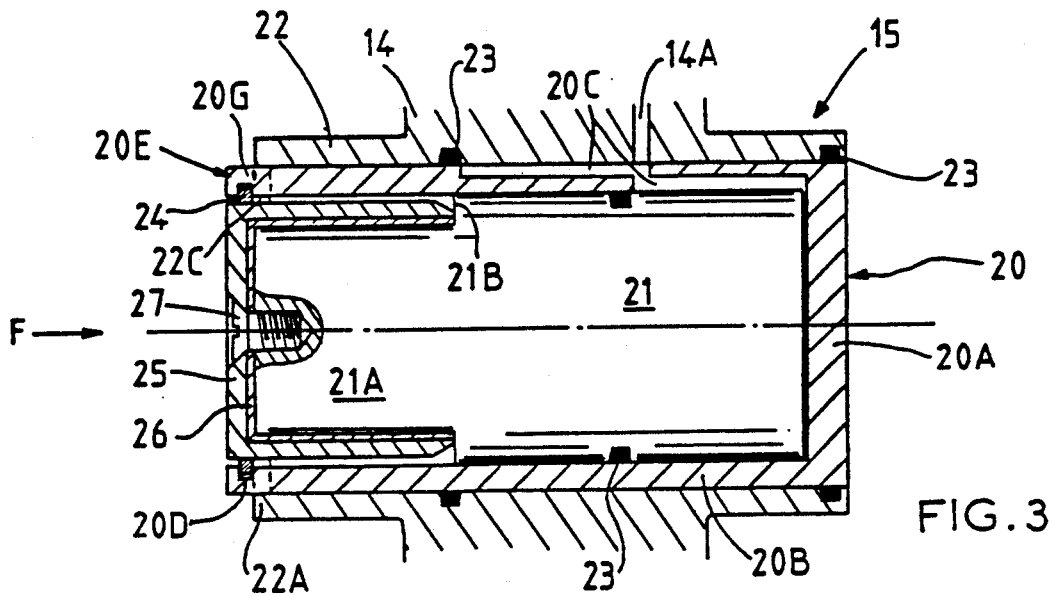
FIG. 3 is an axial cross section of one of the thrust devices of the first pressure means, capable of acting in opposition to the two sets of disks depending on the state of a thermal safety member, said thrust device being in an inactive position.

In order to do this, referring to FIGS. 3 and 4, each thrust device 15 is provided with an intermediate jacket 20 disposed between the piston 21, capable of acting against the metallic disks 4 by means of the pressure plate 19, and the cylinder 22 which in this embodiment advantageously forms an integral part of the support 14. This piston-shaped jacket 20 is mounted head to tail on the piston 21, that is to say its end-part 20A is intended in this case to be applied, as will be seen subsequently, against the carbon disks 5. Rings 23 provide the sealing between the lateral wall 20B of the intermediate jacket 20 and the cylinder 22 and between this wall 20B and the piston 21. A conduit 14A, provided in the support and relating to the hydraulic circuit of the thrust devices, and passages 20C made in the lateral wall 20B of the jacket and bringing the conduit 14A of the hydraulic circuit into communication with the rear of the piston 21, are also illustrated.

Advantageously, the thrust devices 15 are respectively equipped with thermal or fusible safety members 24 which, on the one hand, keep the intermediate jackets 20 in position in relation to the cylinders 22 when the braking operation of the train progresses normally and, on the other hand, allow, thanks to their melting caused by an overheating of the metallic disks 4, the sliding of the jackets 20 in the direction of the carbon disks 5 by means of the hydraulic pressure of the feed circuit. Such an overheating may, for example, occur following a failure of the hydraulic circuit feeding the thrust devices 16 of the carbon disks 5 which are to be actuated when the retarder breaks down. In such a case, the failure is indicated by the detector DT, connected to the operation logic device LA for the braking system SF, which logic device cancels the actuation of the thrust devices 15 of the metallic disks at the prescribed limiting speed VL in order to allow it to operate beyond this speed. Thus, because of the considerable energy to be absorbed, the metallic disks 4 rapidly reach high temperatures which cause the thermal safety members 24 to melt and, consequently, the intermediate jackets 20 to act on the carbon disks 5, so allowing the train to stop.

In order to do this, each member 24 is constituted by a split ring made from a material whose melting point corresponds to a specified overheating temperature of the disks 4, a temperature at which it is desired that the braking operation of the carbon disks 5 by means of the thrust devices 15 comes into play, in the event of an operational anomaly in the hydraulic circuit of the carbon disks. For example the ring 24 may be made from a light alloy.

Structurally, the ring 24 is engaged in an internal peripheral groove 20D provided in the lateral wall 20B of the jacket, in the vicinity of its end 20E opposite the end-part, and it projects from the groove 20D in order to be applied, thanks to its intrinsic elasticity, against and around a casing 25 surrounding the front portion 21A of the piston 21, which part is delimited by a shoulder 21B. This casing 25, which has the shape of a hollow piston, is made from a heat-conducting material such as copper, such that the action of the metallic disks during a braking operation is manifested by a raising of the temperature of the casing 25 and therefore of the split ring 24 which is pressed around it. Therefore, in order to avoid heat losses to the piston 21, an insulating intermediate casing 26, made from a refractory material, is interposed between the front portion 21A of the piston 21 and the heat-conducting casing 25. The two superposed casings 25 and 26 are fixed to the front portion 21A of the piston by means of a screw 27 as is shown in FIGS. 3 and 4.

By referring to these figures, it will be noticed furthermore that the intermediate jacket 20 is kept axially in position in relation to the cylinder 22. The movement of the jacket 20 towards the metal disks 4 is rendered impossible because of an encasement linkage between the jacket 20 and the cylinder 22. The latter is provided with an indented transverse edge 22A which engages and traverses the end 20E of the jacket, which is also indented. Thus, the teeth 22B of the edge traverse the spaces 20F of the indented end 20E of the jacket and are flush with the casing 25; conversely, the spaces 22C of said edge 22A receive the teeth 20G of the end 20E of the jacket. The movement of the latter towards the carbon disks 5 is rendered impossible by the thermal ring 24 joined to the jacket and being applied against the indented edge 22A of the stationary cylinder 22.

The installation of the split thermal ring 24 is possible by dismounting the casing 25 and by reducing the diameter of the ring 24 thanks to its circumferential play, which enables it to be engaged in the internal peripheral groove 20D when all the other parts are in the position of FIG. 3.

The construction of the first pressure means, in the form of double-piston thrust devices, enables the braking of the railroad vehicle to be ensured following a failure of the second pressure means. The thrust devices 15 of the braking device operate in the following manner.

In brief, it will be recalled that, during a normal operation of the electrical retarder RE, the thrust devices 15 act on the metal disks 4 starting from the prescribed limiting speed VL supplied by the sensor CA, a speed at which the retarder becomes ineffective. In this case, the hydraulic fluid traverses the passages 20C of the jackets and pushes the set of pistons 21 towards the left, which pistons, by the agency of the pressure plates 19, cause the frictional action of the metal disks 4 until the train stops.

When the retarder RE is faulty, the carbon disks 5, under the action of the thrust devices 16, in this case advantageously brake the railroad vehicle and stop it.

By contrast, when a breakdown occurs both to the retarder and to the second pressure means, the braking operation of the vehicle progresses thanks to the action of the thrust devices 15.

In order to do this, the detector DT detects the breakdown of the second pressure means in the circuit feeding them and the control logic device LA, to which the detector is connected, overrides the condition for actuating the first pressure means, that is to say the thrust devices 15, starting from the imposed limiting speed VL threshold coming from the sensor CA.

Figure 5:
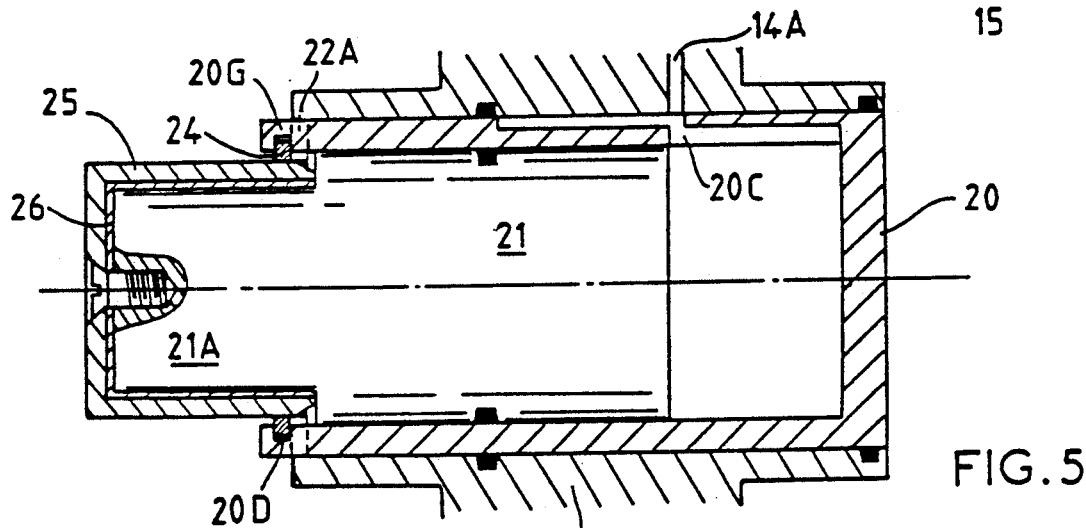
FIG. 5 shows said thrust device illustrated in FIG. 3 in the out position of the piston acting against the metal disks.
Figure 6:
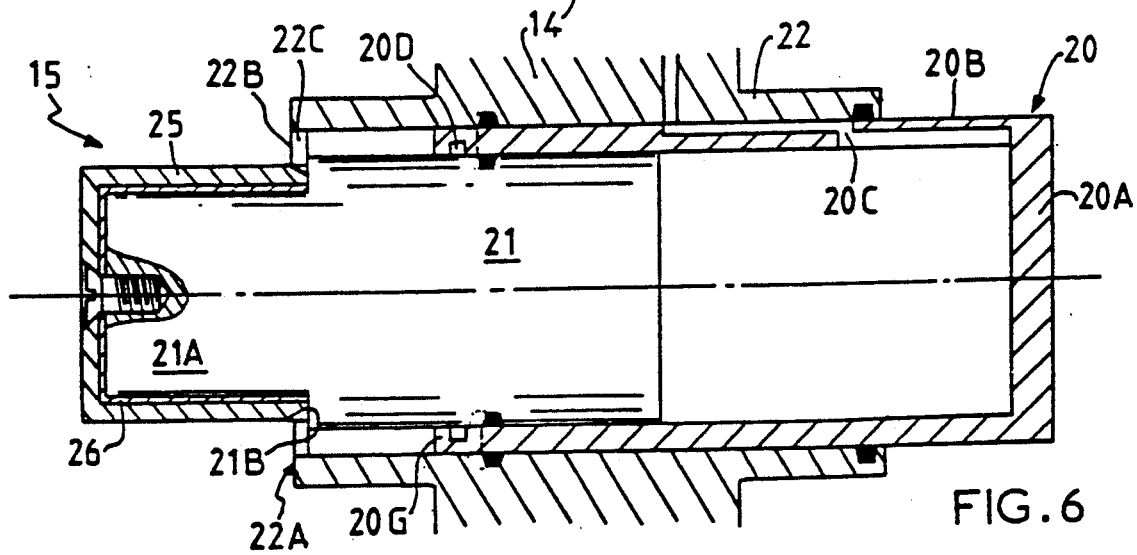
FIG. 6 shows said thrust device illustrated in FIG. 3, in the out position of the intermediate jacket acting against the carbon disks, after said thermal member has melted.

Thus, the thrust devices 15 are fed by the directional control valve DI and the pistons 21 move in order to act on the metal disks, as shown in FIG. 5. Because of the large quantity of energy to be absorbed in order to stop the train, which may be travelling at high speed, the linings 4A₁ of the disks 4 wear out and very rapidly rise in temperature until they reach a specified overheating temperature, corresponding to the melting point of the rings 24 and transmitted by the casings 25. Thus, under the action of the hydraulic pressure which is exerted both on the piston 21 and on the end-part 20A of the jackets 20, in this case the latter slide in the direction of the carbon disks 5 since the rings have melted. The arrangement of the passages 20C, in the form of lateral channels, enables the pressurized fluid to pass to the piston and the end-part of the jacket when the latter slides. It will be noticed that the casings 25 enable heat to be rapidly propagated in the direction of the fusible rings 24. FIG. 6 shows the position then occupied by each thrust device 15 in an extreme case where the piston 21 is in abutment, by means of the shoulder 21B, against the indented edge 22A of the cylinder, whereas the jacket 20 is in the maximum out position. The pistons 21 of the thrust devices are preferably hollow enabling, in a known manner, return springs, not shown, to be housed.

The braking device may continue to operate with the carbon disks 5. It will be noticed that, thanks to the arrangement of the metal disks on the external side of the shaft 2, the replacement of the disks 4 and of the thermal rings 24 of the thrust devices 15 is particularly easy, by dismounting for this purpose the very accessible housing 10.

I claim:

1. A multi-disk braking device for a vehicle equipped with a braking retarder, which device comprises:
    a first set of disks (4) made from a metallic material and of which at least some are integrally connected, in terms of rotation, to a rotary element (2) of said vehicle;
    first pressure means (6) capable of acting on the first set of disks (4) and joined to a stationary element (3) of said vehicle;
    a second set of disks (5) made from carbon and of which at least some are integrally connected, in terms of rotation, to said rotary element;
    second pressure means (7) capable of acting on the second set of disks and joined to said stationary element of the vehicle, said second pressure means being normally inoperative while said braking retarder is operable;
    means (CA, LA, DI, etc.) for controlling the actuation of said first pressure means (6) as soon as the vehicle, braked by said retarder, reaches a prescribed limiting speed; and
    means (DE) for detecting an operational failure of said retarder and for actuating the second pressure means (7) to stop said vehicle using said second set of disks.

2. The device as claimed in claim 1, wherein the total weight of the metallic disks (4) of said first set is very much less than the total weight of the carbon disks (5) of said second set.

3. The device as claimed in claim 1, wherein said first and second pressure means (6, 7) are mounted on one and the same support (14) integrally connected to said stationary element (3).

4. The device as claimed in claim 3, wherein said first and second sets of disks (4, 5) are respectively disposed on each side of said support (14).

5. The device as claimed in claim 1, wherein the disks (4, 5) of each set are alternately joined to the rotary element (2) and to the stationary element (3) and are capable, under the action of their respective pressure means, of sliding axially in order to be applied against each other.

6. The device as claimed in claim 1, wherein said first and second sets of disks are housed in respective housings (10, 11) connected to said stationary element, and wherein said disks of the first and second sets are axially mounted on keys (9, 12) respectively provided on the housings (10, 11) integrally connected to the stationary element and on a hub integrally connected to said rotary element.

7. The device as claimed in claim 6, wherein the two housings (10, 11) are respectively fixed on each side of said support (14) of the first and second pressure means (6, 7), said housing (11) of the second set of carbon disks (5) being integrally connected to said stationary element (3) and being traversed by the rotary element (2), in contrast to said housing (10) of the first set of metallic disks (4).

8. The device as claimed in claim 1, wherein said first and second pressure means (6, 7) are defined by thrust devices (15, 16) whose pistons are capable of acting respectively on the first and second sets of disks (4, 5).

9. The device as claimed in claim 8, wherein said thrust devices (15, 16) are alternately and equi-angularly distributed in relation to said support (14).

10. The device as claimed in claim 1, wherein said first pressure means (6) are capable of acting on the second set of carbon disks (5) should said second pressure means (7) fail operationally, detection means (DT) being provided in order to detect said failure and to allow the actuation of said first pressure means at a speed greater than the prescribed limiting speed.

11. The device as claimed in claim 10, wherein each thrust device (15) of said first pressure means (6) comprises:
   a piston-shaped intermediate jacket (20) capable of acting against the carbon disks (5) and mounted between the cylinder (22) of the thrust device, which is integrally connected to the support, and said piston (21) capable of acting against the metal disks (4); and
   a thermal safety member (24) joined to the end of the jacket (20), opposite its end-part, and surrounding said piston (21), said thermal member (24) keeping said jacket (20) butted up to the carbon disks, as long as the temperature of the metal disks (4) is less than an overheating temperature of said disks, and, by melting, releasing said jacket (20) which acts, under the action of the hydraulic fluid feeding the thrust devices, against the carbon disks (5) when the overheating temperature of the metal disks (4) is reached.

12. The device as claimed in claim 11, wherein said thermal safety member (24) is defined by a ring made from a material which melts as soon as the metallic disks have reached the specified overheating temperature.

13. The device as claimed in claim 11, wherein a casing (25), made from a heat-conducting material, surrounds the front portion (21A) of each piston (21), which portion is turned towards the metallic disks, said thermal member (24) being applied around said casing (25) and wherein an intermediate casing (26), made from an insulating material, is interposed between said front portion (21A) of each piston and said heat-conducting casing (25).

14. The device as claimed in claim 13, wherein the two superposed casings are fixed to the front portion of said piston by means of at least one screw (27).

15. The device as claimed in claim 11, wherein each thrust device cylinder (22) forms an integral part of said support (14).

* * * * *